United States Patent
Michel

(10) Patent No.: US 9,340,182 B2
(45) Date of Patent: May 17, 2016

(54) BELT RETRACTOR FOR A VEHICLE SAFETY BELT

(75) Inventor: Frederic Michel, Schwaebisch Gmuend (DE)

(73) Assignee: TRW Automotive GmbH (DE)

( * ) Notice: Subject to any disclaimer, the term of this patent is extended or adjusted under 35 U.S.C. 154(b) by 188 days.

(21) Appl. No.: 13/982,559

(22) PCT Filed: Jan. 18, 2012

(86) PCT No.: PCT/EP2012/000203
§ 371 (c)(1),
(2), (4) Date: Aug. 23, 2013

(87) PCT Pub. No.: WO2012/107162
PCT Pub. Date: Aug. 16, 2012

(65) Prior Publication Data
US 2013/0320126 A1    Dec. 5, 2013

(30) Foreign Application Priority Data

Feb. 10, 2011  (DE) .......................... 10 2011 010 973

(51) Int. Cl.
*B60R 22/34*    (2006.01)
(52) U.S. Cl.
CPC ......... *B60R 22/34* (2013.01); *B60R 2022/3402* (2013.01); *B60R 2022/3427* (2013.01)
(58) Field of Classification Search
CPC ................................ B60R 22/28; B60R 22/36
USPC ............................................. 242/376, 379.1
See application file for complete search history.

(56) References Cited

U.S. PATENT DOCUMENTS

| | | | | |
|---|---|---|---|---|
| 4,385,736 A | * | 5/1983 | Yamamoto | 242/376 |
| 4,623,104 A | * | 11/1986 | Mori | 242/376 |
| 4,967,976 A | * | 11/1990 | Kawai et al. | 242/586.2 |
| 5,722,611 A | * | 3/1998 | Schmid et al. | 242/376 |
| 5,823,570 A | | 10/1998 | Lane, Jr. et al. | |
| 6,336,606 B1 | * | 1/2002 | Smithson et al. | 242/376 |
| 6,405,962 B1 | * | 6/2002 | Hirase | 242/379.1 |
| 2002/0175242 A1 | | 11/2002 | Kohlndorfer et al. | |
| 2002/0190151 A1 | * | 12/2002 | Bell et al. | 242/376 |
| 2004/0021027 A1 | | 2/2004 | Kohlndorfer et al. | |

FOREIGN PATENT DOCUMENTS

| | | |
|---|---|---|
| DE | 3244204 | 5/1984 |
| DE | 4023662 | 2/1991 |
| DE | 19744836 | 5/1998 |
| DE | 60130276 | 5/2008 |
| EP | 1053918 | 11/2000 |
| EP | 1637413 | 3/2006 |

* cited by examiner

*Primary Examiner* — Sang Kim
(74) *Attorney, Agent, or Firm* — Tarolli, Sundheim, Covell & Tummino LLP

(57) ABSTRACT

A belt retractor (5) for a vehicle seat belt includes a frame (10) made of plastic material and two side legs (16) between which a belt reel (22) equally made of plastic material is arranged. The belt reel (22) is provided with a flange (26) at each of its end faces and a retaining pin (32) to which the seat belt (7) is fastened is accommodated in the belt reel (22). The retaining pin (32) extends into the flanges (26) of the belt reel (22).

20 Claims, 2 Drawing Sheets

BELT RETRACTOR FOR A VEHICLE SAFETY BELT

RELATED APPLICATIONS

This application corresponds to PCT/EP2012/000203, filed Jan. 18, 2012, which claims the benefit of German Application No. 10 2011 010 973.0, filed Feb. 10, 2011, the subject matter, of which are incorporated herein by reference in their entirety.

BACKGROUND OF THE INVENTION

The invention relates to a belt retractor for a vehicle seat belt.

A belt retractor usually comprises a frame made of metal in which a belt reel is supported. The seat belt can be wound onto the belt reel. An interlock mechanism enables the belt reel to be locked as a function of predetermined parameters so that the seat belt can be unwound from the belt retractor either not at all or only against a very high retaining force so as to retain the vehicle occupant.

The belt reel usually consists of zinc die casting and includes a slit through which the belt webbing extends. For fastening the seat belt on the belt reel usually a pin is used which is inserted in a loop of the belt webbing and has a diameter larger than the thickness of the slit.

From patent literature it is moreover known to manufacture belt reels and/or the frame and the housing of the belt retractor of plastic material. This is intended, on the one hand, to reduce weight and, on the other hand, to reduce costs. Belt retractors of this type are known, for example, from EP 1 637 413 B1 and DE 40 23 662 A1. Casings and reels made of plastic material have not been practically used in automotive vehicles so far, however. Among other things, this is due to the fact that the safety requirements of the car manufacturers and legal load requirements, especially breaking loads, are so high that while maintaining the mounting volume of conventional belt retractors they have not easily been met as yet by casings and reels made of plastic material.

SUMMARY OF THE INVENTION

It is the object of the invention to provide a belt retractor having a frame and a belt reel made of plastic material which is capable, without any substantial increase in the mounting volume vis-à-vis conventional belt retractors, of absorbing high take-off forces and satisfies the legal requirements as regards the breaking load.

For achieving this object, according to the invention a belt retractor for a vehicle seat belt is provided comprising a frame made of plastic material and having two side legs between which a belt reel equally made of plastic material is arranged. For fastening the belt webbing on the belt reel a retaining pin accommodated in the belt reel is provided. Said retaining pin extends into the flanges of the belt reel. This permits introducing the forces exerted by the belt webbing on the retaining pin, when the belt webbing is completely unwound from the belt reel, directly into the flanges and from there into the side legs of the frame.

For this, it is especially advantageous for the retaining pin to have a length which approximately corresponds to the width of the frame.

Preferably the retaining pin is exposed in its area between the two flanges. This allows for subsequently guiding the belt webbing around the retaining pin after the latter has been mounted on the belt reel.

The retaining pin is preferably injected in the belt reel. This avoids a separate mounting step.

In order to withstand high breaking loads and to be adapted to absorb high take-off forces of the belt webbing it is of further advantage when the belt reel is provided on each end face with a flange having a blocking tooth system and a support surface and the frame is provided in each side leg with a toothing area and a contact surface for the belt reel. The toothing area of the belt retractor guarantees, along with the blocking tooth system of the belt reel that blocking torques generated by the tensile forces of the belt webbing when the belt reel is blocked can be reliably absorbed by the frame. The contact surface at the frame together with the support surface at the belt reel ensures that the acting tensile forces are reliably absorbed by the frame. This enables the required loads to be absorbed by a frame consisting mostly or completely of plastic material.

Preferably the blocking tooth system and the support surface have an annular design and are adjacent each other in axial direction. This entails a compact configuration of the belt reel.

According to a preferred embodiment, the support surface is located axially within the blocking tooth system. Especially when the blocking tooth system has a smaller diameter than the support surface, the belt reel is captively accommodated in the belt reel.

Preferably there is provided a supporting land formed integrally with the two side legs of the frame and interconnecting the same. The supporting land increases the stability of the frame as it prevents the two side legs from laterally backing away.

The toothing area preferably extends over an angle of no more than 120°. As the unwinding direction of the belt webbing from the belt retractor is known, the active blocking torques can be absorbed already by only one local toothing area. In this way it is not necessary to provide a female mold of the tooth system for the frame over the entire circumference in the injection molding die.

It is provided according to a preferred embodiment that the blocking tooth system and the toothing area are designed to be undercut. This assists a reliable torque transmission.

In accordance with a preferred embodiment, the belt reel has a massive design in its central portion. This configuration is based on the finding that the strength of the belt reel can be considerably increased when the central portion is designed without providing the slit for the previously usual belt webbing.

According to the preferred embodiment of the invention, the belt reel is captively accommodated in the frame.

According to a configuration of the invention, it is provided that between the two flanges the belt reel includes a central portion which can be compressed in radial direction. This configuration is adapted to integrally realize a force limiting function in the belt reel, as a reduction of the diameter of the central portion in the case of high belt webbing forces results in the fact that additional belt webbing can be unwound from the belt reel.

A compressible central portion can be formed, for instance, by the belt reel having plural ribs in its central portion. Said ribs exhibit such strength that they are yielding with the desired radial compressing forces.

As an alternative, it can also be provided that the central portion is made of foam material. The foam material can be compressed by the belt webbing in the radial direction, when adequately high tensile forces are acting within the belt webbing. The foam material is preferably applied to a core consisting of a higher strength material in the form of a coating.

BRIEF DESCRIPTION OF THE DRAWINGS

Hereinafter the invention will be described by way of a preferred embodiment represented in the enclosed drawings, in which.

DESCRIPTION OF EXEMPLARY EMBODIMENT

Figure 1:
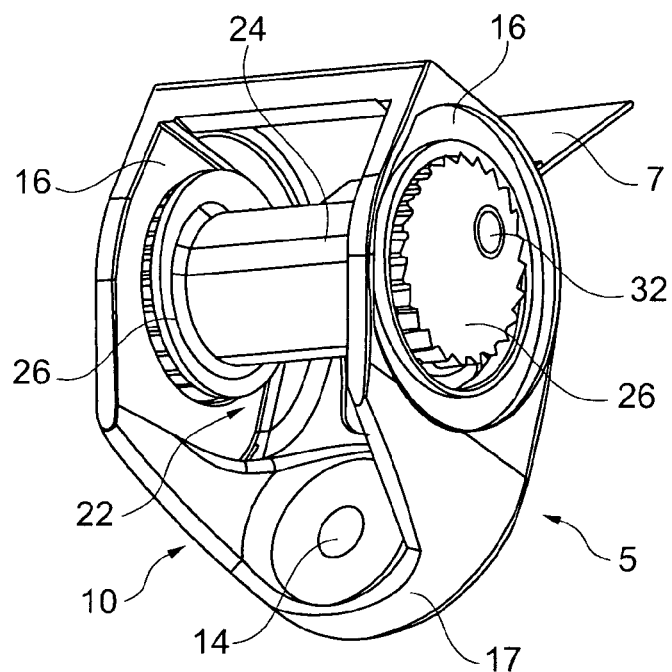
FIG. 1 shows a perspective view of a belt retractor according to the invention.
Figure 2:
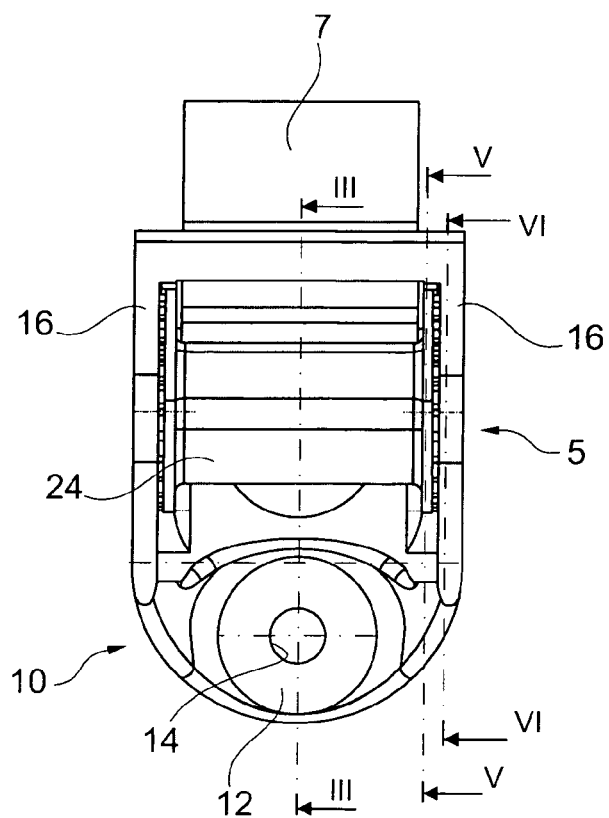
FIG. 2 shows the belt retractor of FIG. 1 in a front view.
Figure 3:
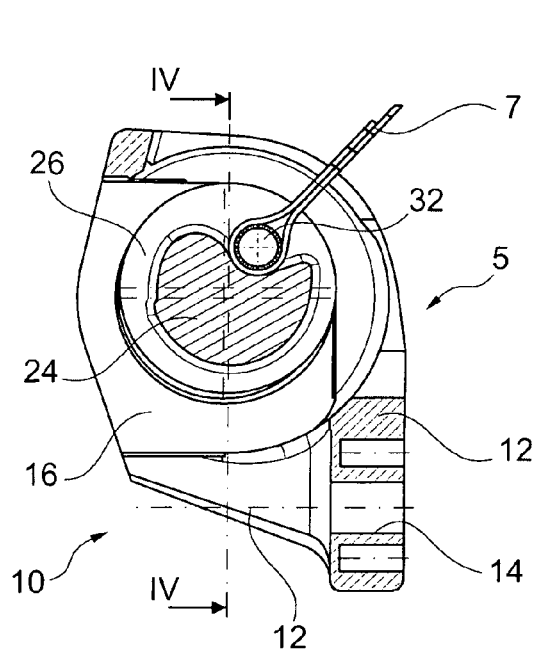
FIG. 3 shows a section along the plane of FIG. 2.

The figures illustrate a belt retractor 5 adapted to accommodate a belt webbing 7 of a seat belt. The belt retractor includes a frame 10 having a fastening portion 12 including a fastening orifice 14 as well as two side legs 16. The fastening portion 12 extends over less than the height of the entire frame (see especially FIG. 3) so that the bearing surface and thus the interface to the vehicle body is reduced to a minimum surface.

Figure 4:
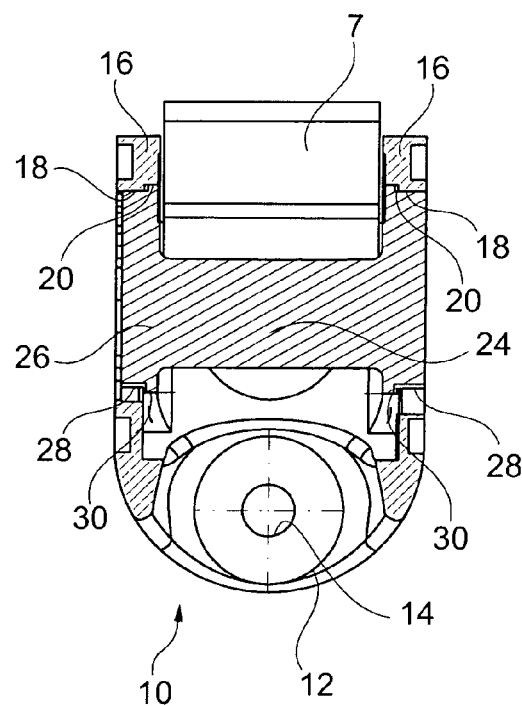
FIG. 4 shows a section along the plane IV-IV of FIG. 3.
Figure 5:
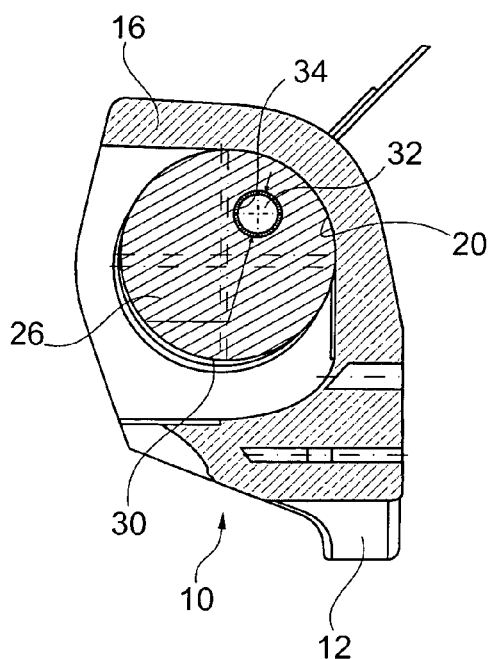
FIG. 5 shows a section along the plane V-V of FIG. 2.
Figure 6:
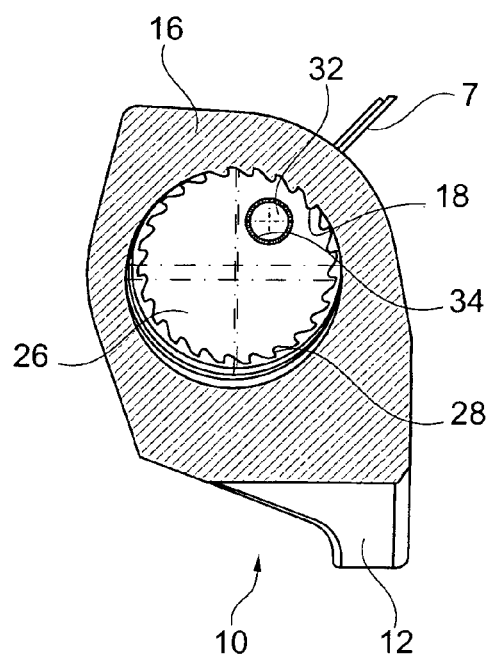
FIG. 6 shows a section along the plane VI-VI of FIG. 2.

The two side legs 16 are interconnected by a supporting land 17 which is diametrically opposed to the fastening orifice 14 related to the belt reel 22. In the two side legs 16 of the belt retractor a toothing area 18 and a contact surface 20 are provided adjacent each other. The toothing area 18 includes an undercut tooth system and extends over an angular area of less than 120° in this case. The center of the toothing area approximately coincides with the direction of unwinding of belt webbing from the belt retractor (see FIG. 6). The contact surface 20 has an approximately quadrantal shape in this case (cf. FIG. 5) and is arranged approximately in the same sector as the toothing area 18. As can be seen especially in FIG. 4, the toothing area 18 and the contact surface 20 are axially juxtaposed related to the central axis of the belt reel, the toothing area 18 being located outside and the support surface being located inside.

Between the two side legs 16 a belt reel 22 is arranged having a central portion 24 and a flange 26 at each of the end faces. Each flange 26 is provided with blocking tooth system 28 and a support surface 30 which takes a ring shape. As can be inferred especially from FIG. 4, the blocking tooth system 28 has a smaller diameter than the support surface 30. The two support surfaces 30 are located inside the two blocking tooth systems 28.

The bearing shells used to support the belt reel and the lock mechanism required for blocking the belt reel are not shown here.

For fastening the belt webbing 7 a retaining pin 32 is provided which is made of metal and is accommodated in each of the orifices 34 in the flanges 26 of the belt reel 22. Along the central portion 24 of the belt reel 22 the retaining pin 32 is exposed so that the belt webbing can be wound around the same and then can be sewed up. The retaining pin 32 exhibits a length corresponding to the axial length of the belt reel 22. Thus the retaining pin 32 extends from the outside of a flange 26 to the outside of the second flange.

Both of the frame 10 and the belt reel 22 are made of plastic material and are especially injection-molded. The retaining pin 32, too, can be injected directly into the flanges 26 of the belt reel 22.

During operation the belt reel is locked by being shifted, in the case of need, relative to the frame 10 so far that its blocking tooth system 28 engages in the toothing area 18 in the frame 10. As the tooth system is configured to be undercut, this ensures reliable transmission of the torque. Particularly high tensile loads are additionally transmitted by the support surfaces 30 of the belt reel 22 contacting the contact surfaces 20 of the frame 10. As is evident from a comparison of the sectional views in FIGS. 5 and 6, the side legs 16 are very massive in the area surrounding the blocking tooth system 28 and surround the belt reel on all sides, whereas in the area of the support surface 30 material is merely provided wherever the supporting effect is required. The configuration of the retaining pin 32 extending into the flanges 26 of the belt reel causes the forces exerted by the belt webbing 7 on the retaining pin 32 to be guided directly into the frame without the central portion of the belt reel being loaded. This is of advantage especially when very high tensile forces are acting in the belt webbing 7 in a condition in which the entire belt webbing is unwound from the belt reel.

In accordance with a development not represented here, the central portion 24 of the belt reel 22 can have a design that is not completely massive, as is shown in the figures, but may have plural ribs adapted to be deformed by especially high tensile forces in the belt webbing. Upon deformation of the ribs the diameter of the belt reel 22 is reduced so that further belt webbing can be unwound. In this way sort of a controlled film-spool effect can be achieved which can be used for controlled force limitation without any separate force limiters, for example in the form of a torsion rod, having to be mounted. Alternatively to the ribs, at the central portion 24 of the belt reel there may also be provided a layer of foam material which is compressed by the belt webbing in the case of especially high tensile forces. This, too, enables further belt webbing to be unwound from the rotationally locked belt reel for the purpose of force limitation.

The invention claimed is:

1. A belt retractor (5) for a vehicle seat belt comprising a frame (10) made of plastic material and having two side legs (16) between which a belt reel (22) made at least partially of plastic material is arranged, wherein the belt reel (22) is provided with a flange (26) at each of the end faces and in the belt reel (22) a retaining pin (32) is accommodated to which the seat belt (7) is fastened, and said retaining pin (32) extends into the flanges (26) of the belt reel (22), wherein said retaining pin (32) has a length corresponding approximately to the width of the frame (10), the pin being spaced from and extending parallel to a longitudinal axis of the belt reel.

2. The belt retractor according to claim 1, wherein the retaining pin (32) is exposed in its area between the two flanges (26).

3. The belt retractor according to claim 1, wherein the retaining pin (32) is injected into the belt reel (22).

4. The belt retractor according to claim 1, wherein the belt reel (22) is massive in its central portion (24).

5. The belt retractor according to claim 1, wherein the flanges of the belt reel include blocking tooth system (28) and a support surface (30) and the frame (10) is provided in each side leg (16) with a toothing area (18) and a contact surface (20) for the belt reel (22).

6. The belt retractor according to claim 5, wherein each of the blocking tooth system (28) and the support surface (30) takes a ring shape and is arranged adjacent in an axial direction.

7. The belt retractor according to claim 5, wherein the support surfaces (30) are located between the blocking tooth systems (28).

8. The belt retractor according to claim 5, wherein the blocking tooth system (28) has a smaller diameter than the support surface (30).

9. The belt retractor according to claim 5, wherein the toothing area (18) extends over an angle of no more than 120°.

10. The belt retractor according to claim 5, wherein the blocking tooth system (28) and the toothing area (18) are designed to be undercut.

11. The belt retractor according to claim 1, wherein there is provided a supporting land (17) that is formed integrally with the two side legs (16) of the frame (10) and interconnects the same.

12. The belt retractor according to claim 1, wherein the belt reel (22) is captively accommodated in the frame (10).

13. The belt retractor according to claim 1, wherein the belt reel (22) includes a central portion (24) compressible in a radial direction between the two flanges (26).

14. The belt retractor according to claim 13, wherein the central portion (24) has plural ribs.

15. The belt retractor according to claim 13, wherein the central portion (24) is made of foam material.

16. The belt retractor according to claim 1, wherein the retaining pin (32) has an axial length equal to an axial length of the belt reel (22).

17. The belt retractor according to claim 1, wherein each flange (26) includes a blocking tooth system (28) and a support surface having a diameter that is larger than a diameter of the blocking tooth system (28).

18. The belt retractor according to claim 1, wherein the belt reel is rotatable relative to the frame about the longitudinal axis and is free of openings along the longitudinal axis between the flanges.

19. The belt retractor according to claim 18, wherein each flange (26) includes a blocking tooth system (28) and an annular support surface (30), the support surfaces (30) being positioned between the blocking tooth systems (28) and having a larger diameter than a diameter of the blocking tooth systems (28).

20. The belt retractor according to claim 1, wherein the belt reel is free of an opening intersecting the longitudinal axis through which the seat belt extends.

* * * * *